Figure 1:
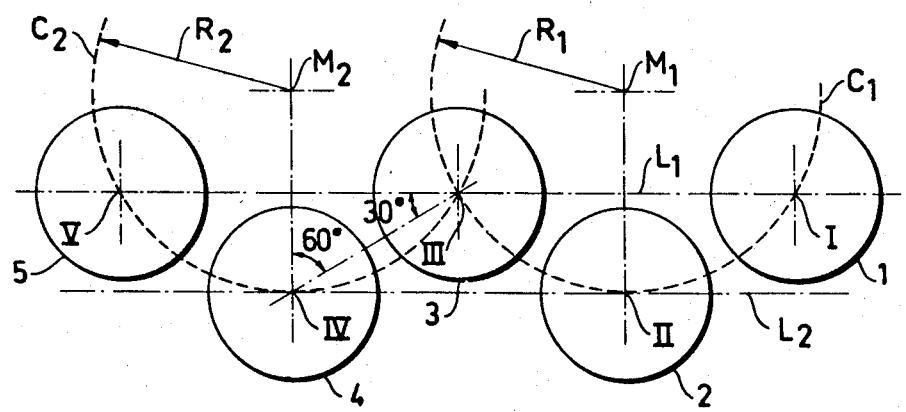

United States Patent

[11] 3,579,785

[72] Inventor Lars Ingvar Hellborg
   Lund, Sweden
[21] Appl. No. 814,249
[22] Filed Apr. 8, 1969
[45] Patented May 25, 1971
[73] Assignee Sobrefina S.A.
   Fribourg, Switzerland
[32] Priority May 12, 1966
[33] Sweden
[31] 6504/66

[54] APPARATUS FOR UNITING A PLURALITY OF FIRST OBJECTS WITH A CORRESPONDING NUMBER OF SECOND OBJECTS
4 Claims, 5 Drawing Figs.
[52] U.S. Cl..................................................... 29/200,
   29/208, 29/240
[51] Int. Cl...................................................... B23p 19/00,
   B23p 19/04
[50] Field of Search.......................................... 29/200,
   208, 240

[56] References Cited
UNITED STATES PATENTS
3,108,363  10/1963  Haumiller..................... 29/208
3,170,231  2/1965  Gleason........................ 29/208

Primary Examiner—Thomas H. Eager
Attorney—Pierce, Scheffler and Parker

ABSTRACT: Apparatus for uniting a plurality of container bodies with outer sleeves comprises a pair of parallel spaced rotationally mounted members having pockets which receive the sleeves. The pocketed members are rotated in a step-by-step manner so as to simultaneously advance the sleeves into a spacial configuration wherein the centers of the sleeves are located in longitudinal spaced relation along two parallel straight lines. A rotationally mounted multisided turret also rotatable in a step-by-step manner includes along each side thereof a like number of holders having the same spacial configuration as that of the sleeves, plungers transfer the sleeves from their pockets to the holders, and the container bodies arranged with the same spacial configuration as the sleeves are then inserted in the sleeves after the sleeves have been transferred to the holders on the turret.

INVENTOR
Lars Ingvar Hellborg

APPARATUS FOR UNITING A PLURALITY OF FIRST OBJECTS WITH A CORRESPONDING NUMBER OF SECOND OBJECTS

This invention relates to an improved apparatus for simultaneously uniting a number of first objects with a corresponding number of second objects which are arranged in a certain characteristic configuration and is a division of my application Ser. No. 637,817, filed May 11, 1967 now U.S. Pat. No. 3,479,726.

The invention has been made in connection with the development of a machine for the manufacture of packaging containers which comprise a plastic lining made from two plastic details which have been deep drawn from flat webshaped materials and thereupon welded together. Preferably a number of details are manufactured simultaneously in that one has mounted several forming tools in each forming unit, whereby the capacity of the machine is essentially increased. In order to reduce the unavoidable waste of plastic material it is of the greatest importance that the forming tools be given a suitable configuration.

The packaging containers also comprise an outer sleeve preferably made from cardboard which surrounds and supports the cylindrical sidewall of the plastic lining and which is dimensioned so as to enable it to be made at reasonable costs.

In the referred to machine the formed plastic details are further arranged to remain in their respective forming cavities during the welding operation; also during the subsequent transportation to a sleeve uniting station, the formed and welded container bodies, i.e. the linings in the finished packaging containers, keep their characteristic configuration.

A primary objective of the present invention is to simplify uniting of the container bodies with the outer sleeves by accomplishing this on a multiple basis. In this particular application of the inventive concept, the sleeves herein define the above mentioned first objects and the plastic container bodies the said second objects. According to the invention, the sleeves are first moved to a position straight in front of the container bodies, whereupon all the sleeves in the first group simultaneously, by an axial movement, are brought over upon the container bodies. The invention according to this preferred embodiment is further characterized in that at least certain of the sleeves under its grouping movement are moved to the desired configuration along one or more circular paths.

The invention is thus generally characterized in that the said first objects by a grouping movement —whereunder at least certain of the objects are moved along a first circular path in a plane perpendicular to the axes of the objects— are caused to adopt the same configuration as the said second objects, so that the axes of symmetry of the objects in the two groups will coincide, whereupon the two groups are moved axially towards each other so that all the objects in the first group are simultaneously united with the corresponding objects in the other group.

More particularly, the apparatus in accordance with the invention for grouping the first objects i.e. the sleeves into the desired configuration comprises a pair of rotationally mounted members located in parallel spaced relation and having circumferentially spaced pockets into which the sleeves are fed. The pocketed members are rotated in a step-by-step manner with a dwell period between successive movements so as to simultaneously advance the sleeves into a spacial configuration wherein the centers of the sleeves into are located in longitudinally spaced relation along two parallel straight lines. A multisided turret includes along each side thereof a like number of holders having the same spacial configuration as that of the sleeves, plungers transfer the sleeves from their pockets to the holders during the dwell period, the turret is rotated 90°, and the second objects, i.e. container bodies, arranged with the same spacial configuration as the sleeves are then inserted in the latter.

Figure 2:
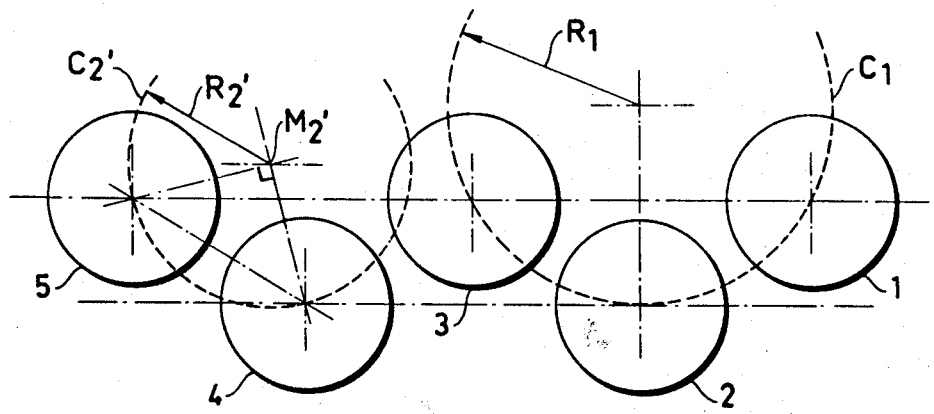
Figure 3:
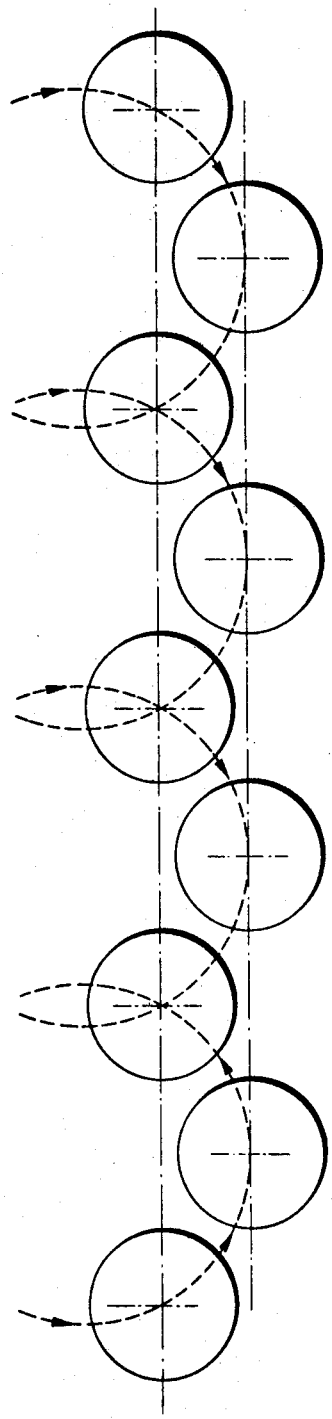
Figure 4:
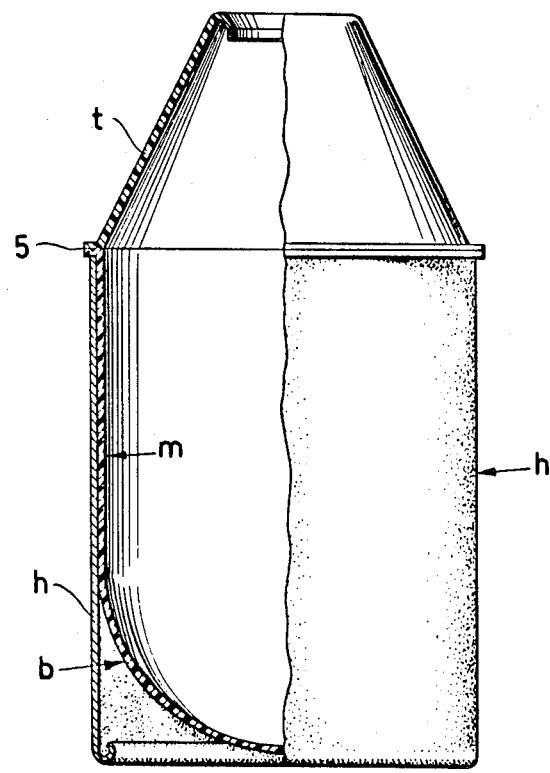
Figure 5:
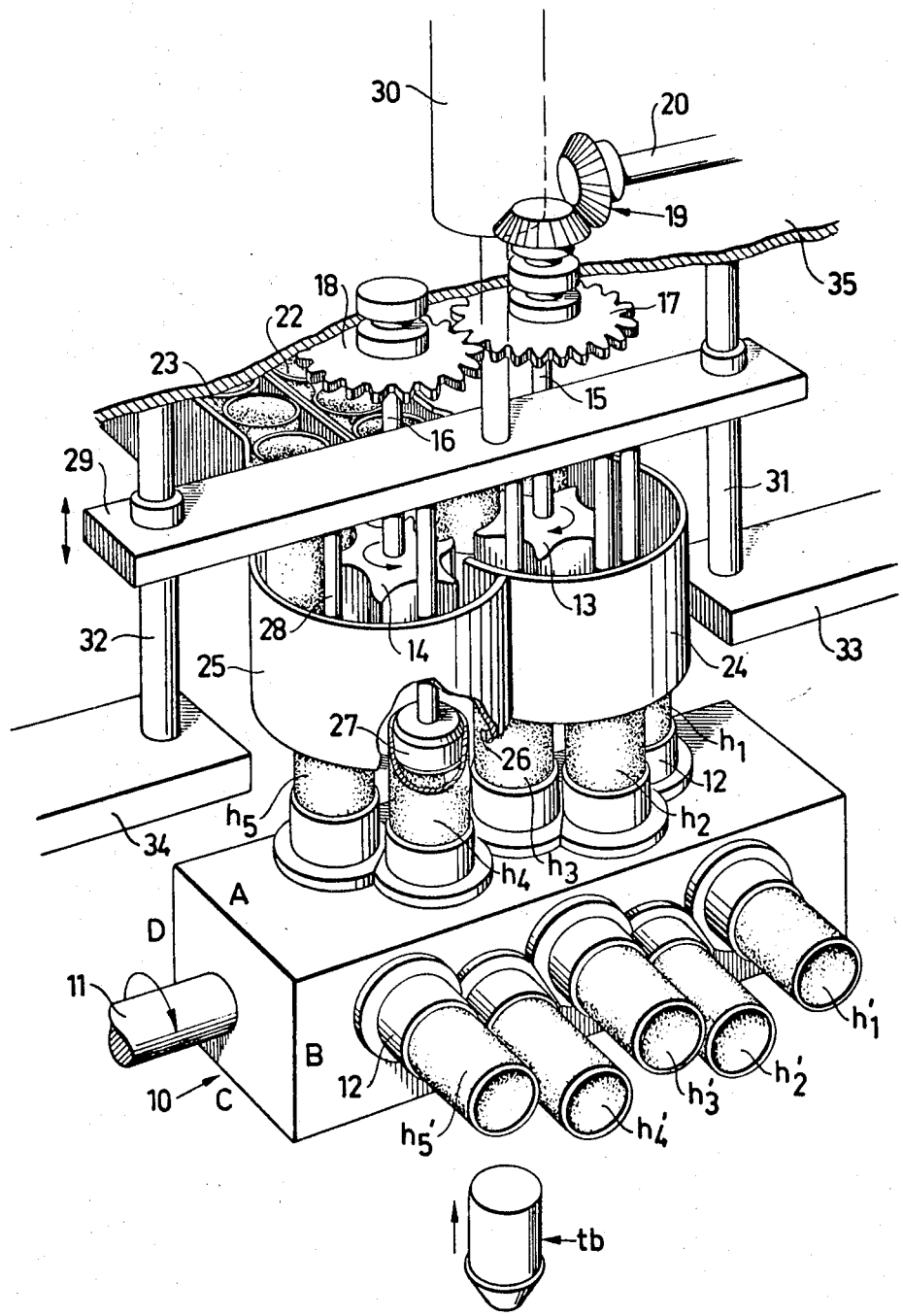

The invention will now be more precisely described with reference to the accompanying detailed description of a preferred embodiment thereof and from the accompanying drawings wherein:

FIG. 1 shows some principles of the invention according to a preferred solution of the grouping problem, FIG. 2 shows a second, somewhat modified solution, FIG. 3 shows how the principles of the invention can be applied to a greater number of objects, FIG. 4 is a vertical view, partly in elevation and partly in section, of a packaging container for the manufacture of which the invention is intended to be applied, and FIG. 5 is a perspective view of the improved apparatus in which the principles of the invention are intended to be applied.

With reference now to FIG. 1, numerals 1, 2, 3, 4 and 5 generally show cylindrical objects as seen from above, e.g. sleeves intended to be brought over upon container bodies of the kind mentioned. The objects will, in the following, for the sake of simplicity be called sleeves, the invention, however, not being limited only to this kind of objects. According to FIG. 1, the sleeves have been arranged in the desired spacial relationship which is characterized in that the sleeves are grouped on two parallel lines $L_1$ and $L_2$. If the center points of three sleeves which are adjacent to each other, e.g. the sleeves 3, 4 and 5, are connected by straight lines, the centers will define corners of a triangle having the angles 30°, 30° and 120°. This choice is due to the fact that the least waste of material, when punching out circular blanks from a flat material, is achieved at these particular angle relationships.

According to a well-known mathematical principle, three points can define only one circular line. The circular line having the radius $R_1$ and which is defined by the center points I, II, III of the sleeves 1, 2 and 3 respectively has been designated $C_1$ in the figure. In a similar manner, the center points III, IV, V of the sleeves 3, 4 and 5, respectively in the shown configuration define a circular line $C_2$. That the radius $R_2$ of the circle $C_2$ has the same length as the radius $R_1$ of the circle $C_1$ should not require any further proof to a person slightly skilled in mathematics.

The geometric circumstances have been utilized in accordance with the invention in that three of the sleeves, i.e. the sleeves 1, 2 and 3 when being advanced to their positions in the desired configuration are caused to follow the circular line $C_1$, while the two sleeves 4 and 5 are caused to follow the circular line $C_2$. Herein it will be possible to use rotatable members as conveyors, e.g. star shaped bodies instead of a more complicated equipment. The centers of rotation of the rotatable members are provided so as to coincide with the center points $M_1$ and $M_2$ of the circles $C_1$ and $C_2$, respectively.

In FIG. 2 is shown how the sleeves may be advanced to the desired position according to a modified embodiment of the invention. According to this modification, the sleeves 1, 2 and 3 are moved along the circular path or line $C_1$ in the same manner as above described, while the sleeves 4 and 5 are caused to follow the circular line $C_2$, the radius of which is $$R_2 = R_1 \times \frac{1}{\sqrt{2}}$$

The central point $M_2$ of the circle $C_2$ thus will be positioned in the right angle corner of the right angled, isosceles triangle, the hypotenuse of which is defined by the central points IV and V of the sleeves 4 and 5, respectively. Also, according to this embodiment, rotatable star shaped bodies may be used for the advance of the sleeves 4 and 5 as will be described in more detail in the following.

Of course it is possible to modify the method of advancing the sleeves also in other ways. If, for instance, the number of objects is only four, one may very well advance three sleeves along a circular line while the fourth sleeve is moved to its position in the desired configuration in any other way. It is also possible to advance the sleeves two and two. If, on the other hand, a large number of objects is to be grouped, the principles of the invention may be utilized in that the number of circular lines is increased, as is illustrated in FIG. 3.

The packaging container shown in FIG. 4 generally consists of three parts, viz. a top portion $t$, a bottom portion $b$ including a cylindrical sidewall $m$, and a sleeve $h$. The sleeve $h$ surrounds the cylindrical sidewall m and its purpose is to support it against inner and outer stresses. Especially the former ones can be considerable, particularly in the case when the contents of the package is a carbonated liquid. The top portion t and the bottom portion b together form a container body or lining tb and are united by a welded joint s.

With reference now to FIG. 5 which illustrates one suitable embodiment of the apparatus which is defined more particularly in the appended claims, numeral 10 designates in a general manner a rotationally mounted turret which is rotatable in a step-by-step manner in steps of 90° around its axis 11. The revolving turret member can adopt four positions, each step corresponding to a quarter of a revolution of the member. The positions of the revolving member have been designated A,B,C, and D. Each side of the member further shows five holders 12 provided to receive and to bring the sleeves to a position for uniting with the container bodies. Herein the holders have been given a configuration that is identical, though reversed, to the configuration of the forming cavities of the top and the bottom portions in another section of the machine, which section is not shown in the drawing.

In the position designated A, five sleeves $h_1$, $h_2$, $h_3$, $h_4$, and $h_5$ are being pushed down into their holders 12. In position B there are five sleeves $h_1'$, $h_2'$, $h_3'$, $h_4'$, and $h_5'$ in their holders 12. In the lower position, i.e. the position which in FIG. 5 has been designated C, five container bodies tb (only schematically shown) are pushed into those sleeves which by means of the revolving member 10 have been advanced to this position. This simultaneous uniting of the five container bodies with the five sleeves is made possible by the fact that the container bodies and the sleeves have equal configurations. In the fourth position D the finished packaging containers are pushed out of their holders 12.

Numbers 13 and 14 show two six-pointed star shaped bodies which are stepwise rotatable by means of the axles 15 and 16 respectively. The movements of the two star-shaped bodies 13 and 14 are dependent upon the meshed cog wheels 17 and 18 respectively, the diameters of which are proportioned 3:2. Numeral 19 shows a bevel gear-drive which provide each movement of indexation (each step of the revolving member) together with the drive shaft 20 to turn the shaft 15 and therewith the cog-wheel 17 and the star-body 13 half a revolution i.e. 180°. The star-body 13, on the other hand will, because of the 3:2 proportions of the meshed cog-wheels 17 and 18 only be turned 120°.

The sleeves which are to be advanced five and five to the desired arrangement are conveyed into chutes 22 and 23 defined by parallel sidewall plates. The chutes first are quite straight, the sleeves herein sliding along the bottoms of the chutes. The chutes are thereafter curved at 24 and 25 and open at their bottoms. The sidewall plate defining chutes 24 and 25 are shaped so as to establish the configuration of portions of circles. The sleeves are prevented from falling down through the chutes in that the plates 24,25 are provided with rubber borders turned to the interior of the chutes. The rubber borders are located in the lowermost edges of the chutes. In FIG. 5 a chute 25 has been partly cut away so that the arrangement of such a rubber border 26 will be apparent.

In FIG. 5, 27 shows a tool in the form of a plunger provided to push a sleeve $h_4$ down into a holder under the sleeve. Five such tools 27 are provided. They are movable in the axial directions of the sleeves by means of the bars 28 which are mounted on a common, displaceable plate 29. The plate is arranged to be advanced by means of a piston in the power cylinder 30. In FIG. 5 is shown the position when the sleeves have just been pushed down into their holders 12.

The plate 29 is guided in its reciprocating movement by means of two bars 31 and 32, which are fixedly mounted in the details 33, 34 and 35 of a frame.

Though the mode of operation of the apparatus should be apparent from the above description, the operation will nevertheless be more completely described in the following. A work-cycle is finished when the plunger tools 27 have returned to their upper positions after having pushed down a group of sleeves into the sleeve holders 12. A new work-cycle is started when the revolving member 10 begins to turn a quarter of a revolution in the direction indicated by the arrow. At the same time, and preferably by means of the same driving means which turn the axle 11 the drive shaft 20 turns the six-pointed star-body 13 180° in the direction indicated by the arrow, via the drive gear 19 and shaft 15 whereby three sleeves $h_1$, $h_2$, $h_3$ are advanced along a circular line (corresponding to the circle $C_1$ in FIG. 1) by the pockets formed in the body 13 to their positions in the desired configuration. The six-pointed star-body 14, however, owing to the 3:2 diametral relationship between the cog-wheel 18 is turned only 120° in the contrary direction, said second star-body by means of the pockets formed therein hereby advancing the sleeves $h_4$ and $h_5$ to their positions in the configurations along a circular line corresponding to the circle $C_2$ in FIG. 1.

When the star-bodies stop, also the revolving member 10 stops turning. A group of empty sleeve-holders now has been advanced to a position under the grouped sleeves. By means of the piston and cylinder arrangement 30 the plate 29 and therewith also the bars 28 and the plunger tools 27 are pushed downwards, pushing the sleeves $h_1$—$h_5$ down into their respective sleeve holders. The tools 27 then return to their original positions finishing the work-cycle.

The apparatus shown in FIG. 5 can, with some slight modifications, be used also for carrying out the alternative solution of the present problem sketched in FIG. 2. The necessary modifications include a diminishing of the star-body 14 and reducing its peaks to only four; a lateral displacement of the shaft 16 for the star-body 14 so as to adopt the position $M_2$, FIG. 2, and giving the cog-wheels 17 and 18 equal diameter so that the ratio of angular movement between the two star-bodies 13 and 14 will be 1:1, i.e. each will be turned through 180°.

I claim:

1. Apparatus for uniting a plurality of first objects with a corresponding number of second objects which comprises a pair of object carrier bodies arranged in parallel spaced relation, said carrier bodies each including circumferentially spaced peripherally located pockets for receiving said first objects from a source of supply, shaft means supporting said carrier bodies for rotation about their axes, a pair of cog-wheels secured respectively to said shafts, means for effecting a step-wise rotation of said cog-wheels and hence also of said carrier bodies to simultaneously advance a plurality of said first objects into a spacial configuration wherein the centers of said objects are located in longitudinally spaced relation along two parallel spaced straight lines, a multisided support member located in spaced relation with respect to said carrier bodies, said support member being provided on each side thereof with a plurality of holders having a spacial configuration corresponding to that of said plurality of first objects, plunger means individual to each pocket in said carrier bodies for pushing the objects therein into the correspondingly positioned holder on said support member, and means for effecting a step-wise rotation of said support member to bring a side thereof in which the holders contain said first objects to a position confronting a corresponding spacial configuration of said second objects and in which position said second objects are then united with said first objects.

2. Apparatus as defined in claim 1 wherein said support member for said holders is provided with four sides and said support member is indexed rotationally through 90° for each object pushing movement of said plunger means.

3. Apparatus as defined in claim 1 for simultaneously uniting five of said first objects with five of said second objects wherein each of said carrier bodies is of the same size and is provided with six object-receiving pockets, wherein said cog-wheels have a diametral ratio of 3:2 and rotate in opposite directions thereby to rotate said carrier bodies in opposite directions, and wherein the larger of said cog-wheels is rotated in steps of 180° thereby effecting a step-wise rotation through 120° of the smaller cog-wheel with which it is meshed, said carrier body which is rotated in steps of 180° simultaneously advancing three of said first objects to the desired spacial configuration and said carrier body which is rotated in steps of 120° simultaneously advancing the remaining two of said first objects to the desired spacial configuration.

4. Apparatus as defined in claim 3 for simultaneously uniting five of said first objects with five of said second objects wherein one of said carrier bodies is provided with six object-receiving pockets and the other carrier body is of smaller size and provided with four object-receiving pockets, wherein said cog-wheels have a diametral ratio of 1:1 and rotate in opposite directions, and wherein said cog-wheels are rotated in steps of 180°, said carrier body having the six pockets therein serving to simultaneously advance three of said first objects to the desired spacial configuration and said carrier body having the four pockets therein serving to simultaneously advance the remaining two of said first objects to the desired spacial configuration.